US012044067B1

(12) United States Patent
Lai

(10) Patent No.: US 12,044,067 B1
(45) Date of Patent: Jul. 23, 2024

(54) SYSTEMS AND METHODS FOR MULTI-SECTION WINDOW BLINDS

(71) Applicant: Tony Lai, Rowland Heights, CA (US)

(72) Inventor: Tony Lai, Rowland Heights, CA (US)

( * ) Notice: Subject to any disclaimer, the term of this patent is extended or adjusted under 35 U.S.C. 154(b) by 0 days.

(21) Appl. No.: 18/491,716

(22) Filed: Oct. 20, 2023

(51) Int. Cl.
*E06B 9/322* (2006.01)
*E06B 9/303* (2006.01)

(52) U.S. Cl.
CPC .............. *E06B 9/322* (2013.01); *E06B 9/303* (2013.01)

(58) Field of Classification Search
CPC .......... E06B 9/324; E06B 9/325; E06B 9/326; E06B 9/382; E06B 9/384; E06B 9/38; E06B 9/386; E06B 9/30; E06B 9/303; E06B 9/322; A47H 11/00–04
See application file for complete search history.

(56) References Cited

U.S. PATENT DOCUMENTS 132,205 A * 10/1872 Fraught ................... F16G 11/08 87/8
889,860 A * 6/1908 Sherwin .................... E06B 9/42 160/259
1,365,919 A * 1/1921 Jones ...................... E06B 9/382 160/115
2,275,273 A * 3/1942 Taylor .................... D04B 21/10 160/178.3
2,459,517 A * 1/1949 Gearhart ................. E06B 9/305 160/115
2,873,499 A * 2/1959 Bartholomew ......... E06B 9/324 24/130
3,111,164 A * 11/1963 Lombard ................ E06B 9/303 160/115
4,593,738 A * 6/1986 Chi Yu .................... E06B 9/303 160/167 R
4,940,070 A * 7/1990 Warden ................... E06B 9/382 160/176.1 R
4,951,729 A * 8/1990 Chi Yu .................... E06B 9/303 160/178.3
5,119,868 A * 6/1992 Werner ................... E06B 9/307 160/115
5,163,492 A * 11/1992 Remington ............. E06B 9/322 160/176.1 V
5,232,037 A * 8/1993 Fraser ..................... E06B 9/307 160/176.1 R
5,485,874 A * 1/1996 Whitmore ............... E06B 9/303 160/178.3

(Continued)

*Primary Examiner* — Johnnie A. Shablack
(74) *Attorney, Agent, or Firm* — CIONCA IP Law P.C.

(57) ABSTRACT

Provided herein are window blinds systems having a first section, double slats within the first section, a second section below the first section, single slats within the second section; outer supporting cords, inner supporting cords, and transverse cords associated with the outer supporting cords and the inner supporting cords, wherein pairs of transverse cords are provided by one upper transverse cord and one lower transverse cord alongside each other, and wherein an amount of space between the double slats larger than an amount of space between the single slats when the windows blinds system is in a fully opened shading arrangement, wherein the window blinds system is configured to be positioned into a variety of shading arrangements by adjusting a tilt angle of the plurality of double slats and the plurality of single slats and by adjusting a distance between neighboring slats of the set of slats.

20 Claims, 10 Drawing Sheets

(56) References Cited

U.S. PATENT DOCUMENTS

| | | | | | |
|---|---|---|---|---|---|
| 5,727,613 | A * | 3/1998 | Judkins | E06B 9/382 160/178.3 |
| 6,076,587 | A * | 6/2000 | Pastor | E06B 9/307 160/115 |
| 6,085,824 | A * | 7/2000 | Cadorette | E06B 9/326 160/177 V |
| 6,305,454 | B1 * | 10/2001 | Judkins | E06B 9/322 160/113 |
| 6,419,001 | B2 * | 7/2002 | Labbe | E06B 9/303 160/115 |
| 6,644,610 | B1 * | 11/2003 | Petrenko | E06B 9/50 160/243 |
| 6,648,048 | B2 * | 11/2003 | Lai | E06B 9/303 160/176.1 R |
| 6,792,999 | B2 * | 9/2004 | Cross | A47H 3/08 474/138 |
| 7,100,664 | B2 * | 9/2006 | Hsu | E06B 9/303 160/115 |
| 7,296,606 | B2 * | 11/2007 | Liang | E06B 9/32 160/115 |
| 7,308,927 | B2 * | 12/2007 | Lai | E06B 9/303 160/173 R |
| 7,424,905 | B2 * | 9/2008 | Lai | E06B 9/303 160/173 R |
| D591,993 | S * | 5/2009 | Chou | D6/581 |
| 7,658,218 | B2 * | 2/2010 | Lai | E06B 9/303 160/176.1 R |
| 7,926,540 | B2 * | 4/2011 | Lai | E06B 9/303 160/178.3 |
| 7,931,069 | B2 * | 4/2011 | Cannaverde | E06B 9/38 474/171 |
| D637,855 | S * | 5/2011 | Patel | D6/580 |
| 9,091,117 | B2 * | 7/2015 | Ng | E06B 9/42 |
| D771,412 | S * | 11/2016 | Ng | D6/580 |
| 9,580,958 | B2 * | 2/2017 | Zhang | E06B 9/68 |
| 9,663,988 | B2 * | 5/2017 | Merker | E06B 9/324 |
| 9,797,190 | B2 * | 10/2017 | Zhang | E06B 9/303 |
| 10,111,551 | B1 * | 10/2018 | Wong | F16B 2/12 |
| 10,190,364 | B2 * | 1/2019 | Tachikawa | E06B 9/384 |
| 10,508,491 | B2 * | 12/2019 | Huang | E06B 9/324 |
| 11,255,123 | B2 * | 2/2022 | Slobbe | E06B 9/307 |
| 11,306,534 | B2 * | 4/2022 | Goldberg | E06B 9/322 |
| 2003/0127197 | A1 * | 7/2003 | Lai | E06B 9/384 160/115 |
| 2009/0314440 | A1 * | 12/2009 | Lai | E06B 9/303 160/170 |
| 2010/0071858 | A1 * | 3/2010 | Lai | E06B 9/307 160/170 |
| 2010/0319859 | A1 * | 12/2010 | Tsai | E06B 9/382 160/178.3 |
| 2011/0108216 | A1 * | 5/2011 | Levin | F16G 11/08 24/115 F |
| 2012/0037322 | A1 * | 2/2012 | Aselton | E06B 9/303 160/168.1 R |
| 2017/0022756 | A1 * | 1/2017 | Kao | E06B 9/78 |
| 2017/0081912 | A1 * | 3/2017 | Guillory | E06B 9/305 |
| 2017/0145742 | A1 * | 5/2017 | Hendriks | E06B 9/326 |
| 2018/0023338 | A1 * | 1/2018 | Werner | E06B 9/02 160/167 R |
| 2019/0041017 | A1 * | 2/2019 | Yui | F21S 19/005 |
| 2019/0145162 | A1 * | 5/2019 | Chou | E06B 9/323 160/150 |

* cited by examiner

SYSTEMS AND METHODS FOR MULTI-SECTION WINDOW BLINDS

BACKGROUND OF INVENTION

1. Field of the Invention

The invention relates generally to window blinds, and more particularly to systems and methods for constructing the blinds such that various configurations of open and closed sections of the blinds in a single panel can be achieved.

2. Description of the Related Art

Generally, curtains and blinds are hung on windows of houses and other dwellings to block lights or maintain privacy inside of the home. However, some drawbacks can be present in existing systems. When the blind is opened, light can enter the house and heat and light up the interior, but this can be unpleasant if the light is too bright or causes glare. When the blind is fully closed, all light may be effectively blocked, but people may then need to turn on interior lights. Users may have a need for some light coming in from the exterior while also having a need for privacy. When the blinds are oriented such that light can enter through the gaps between the blades of the blinds, the size of the blade gap cannot be controlled by the user. This can lead to situations where there is too little or too much light, or too little or too much coverage for privacy. Furthermore, another major drawback of some existing blinds systems is that the blind only has limited operations for obtaining limited shading effects. For example, the user can only control the opening and closing operations of the blinds and the rotation of the blades (also referred to herein as "slats") of the blinds system without being able to control partially open and partially closed positioning of the blades, wherein these options are selectable by the user based on their needs. Therefore, there is a need for a solution to the above problems.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In some embodiments, a window blinds system is provided which comprises at least an upper section and a lower section. In such embodiments, the upper section is configured to provide a double blade gap.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
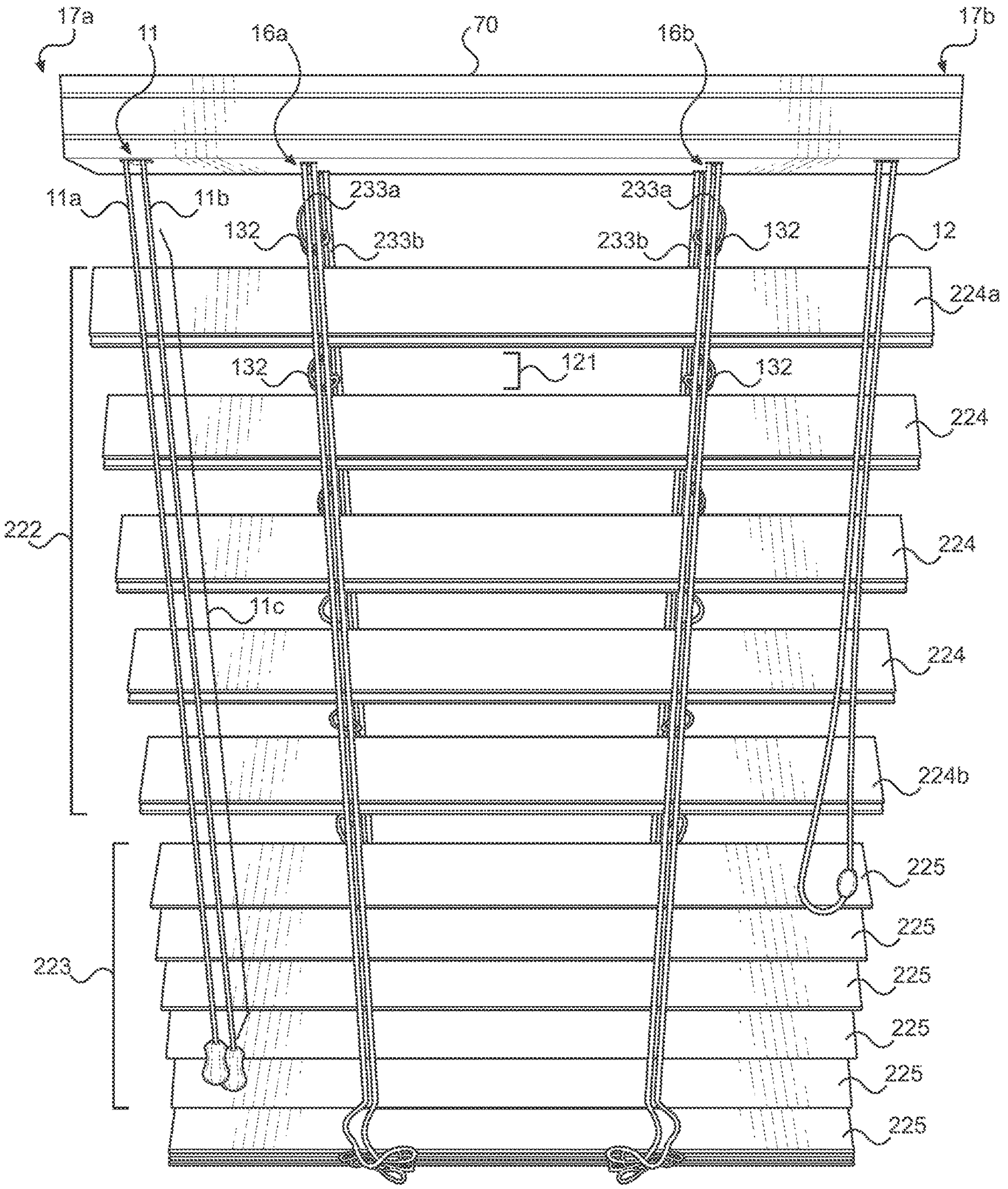
FIG. 1 depicts a front view of a multi-section window blinds system, in an example of a partially opened shading arrangement, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 105 and 205, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 depicts a front view of a multi-section window blinds ("multi-section window blinds," "multi-section blinds," "window blinds" or "blinds") system, in an example of a partially opened shading arrangement, according to an aspect. In some embodiments, the blinds system comprises a headrail ("headrail" or "beam") 70, from which the other components of the blinds system can be housed and hang from. Such components include a plurality of lift cords 11 for lifting the blinds system up and down, a controlling cord 12 for controlling the angle of the slats, a plurality of supporting cords 233*a* and 233*b*, a plurality of transverse cords 132 provided on the plurality of supporting cords, a plurality of double slats 224, and a plurality of single slats 225. In some embodiments, the blinds system comprises at least a first lift cord 11*a* and a second lift cord 11*b*. In some embodiments, the first lift cord 11*a* and the second lift cord 11*b* are two strings separated from each other. In some embodiments, the first lift cord 11*a* and the second lift cord 11*b* may each be provided with a knob 11*c* on a bottom end for ease of use by a user.

In some embodiments, the blinds systems provided herein comprise a first set of cords 16*a* and a second set of cords 16*b*. In such embodiments, each set of cords may comprise a first (outer) supporting cord 233*a* running along a front and back side of the blinds system, a second (inner) supporting cord 233*b* running along a front and back side of the blinds system, a plurality of transverse cords 132 along the supporting cords, and a lift cord 11. As described above, the blinds systems provided herein may comprise two lift cords 11*a* and 11*b*, wherein each of the lift cords are accessible to the user, generally on a first side (which could be a left side) 17*a* of the blinds system via a free-hanging section of the lift cords, generally indicated by 11*c*. The first lift cord 11*a* may be received into an interior section of the headrail 70, and next extend out of the headrail on a first side of the blinds system 17*a*, and makes up a center portion of the first set of cords 16*a* (not clearly visible in FIG. 1, and shown and described in greater detail when referring to FIG. 7). Thus, controlling the free-hanging portion 11*c* of the first lift cord 11*a* can lift or lower the first side 17*a* of the blinds system. The second lift cord 11*b* may be received into an interior section of the headrail 70, and next extend out of the headrail on the second side of the blinds system 17*b*, and makes up a center portion of the second set of cords 16*b* (not clearly visible in FIG. 1, and shown and described in greater detail when referring to FIG. 7). Thus, controlling the free-hanging portion 11*c* of the second lift cord 11*b* can lift or lower the second side 17*b* of the blinds system. Controlling the first and second lift cords 11*a* and 11*b* together can raise and lower the entire blinds system.

In some embodiments, the blinds systems provided herein comprise a first section 222 containing the double slats 224, and a second section 223 containing the single slats 225. In such embodiments, each double slat 224 comprises a pair of slats, which may generally comprise the same shape, size, width, and so on of each of the single slats 225.

In some embodiments, sets of transverse cords 132 are provided along the lift cords 11 at regular intervals, and may be equally spaced apart from neighboring transverse cords. In some embodiments, each double slat 224 is spaced along the lift cords 11 such that a set of transverse cords 132 are appear between neighboring double slats, wherein a distance 121 between neighboring double slats 224 can be created in certain shading arrangements. In some embodiments, the distance 121, having a set of transverse cords between double slats, is referred to as a "double view," meaning that the amount of light and the visible view through the gap is larger than that of the gap between single slats. In some embodiments, each single slat 225 is spaced along the lift cords 11 such that a single slat is spaced apart from the lowest or bottommost double slat 224B, with a set of transverse cords 132 in between the single slat and the bottommost double slat 224B and neighboring single slats 225 are spaced along the lift cords 11 such that each single slat occurs along each set of transverse cords 132. In other words, empty sets of transverse cords generally do not occur in between single slats 225.

As shown as an example in FIG. 1, the blinds systems provided herein may be configurable to be in partially opened, and partially closed states. These may also be referred to as various shading arrangements, which can be used to provide multiple kinds of shading effects. FIG. 1 depicts a partially open shading arrangement wherein the first section 222 comprises double slats 224 that are at a tilt angle such that each slat in a pair, such as pair 224A, are resting on each other in an overlapping manner and closed to the window. In other words, each slat of the double slats 224 is angled generally downwards with respect to the window to block some sunlight and provide some privacy. Meanwhile, each double slat 224 is also separated from neighbor slats by a double gap 121 (also referred to as a "double view"), wherein the double gap is a distance between double slats 224 having space for a set of transverse cords 132 on each set of lift cords 11. It should be understood that "double gap 121" refers to the space between neighboring double slats, or a bottommost double slat 224B and a single slat, and the actual distance of the double gap 121 may vary depending on the tilt angle of the slats, degree of openness of the blinds system, and so on. The second section 223 comprises single slats arranged in an overlapping manner such that each single slat is resting on a neighboring slat, with no gap in between the slats. An advantage may be that some privacy is afforded to the user by closing the view on a bottom portion of a window.

Figure 2:
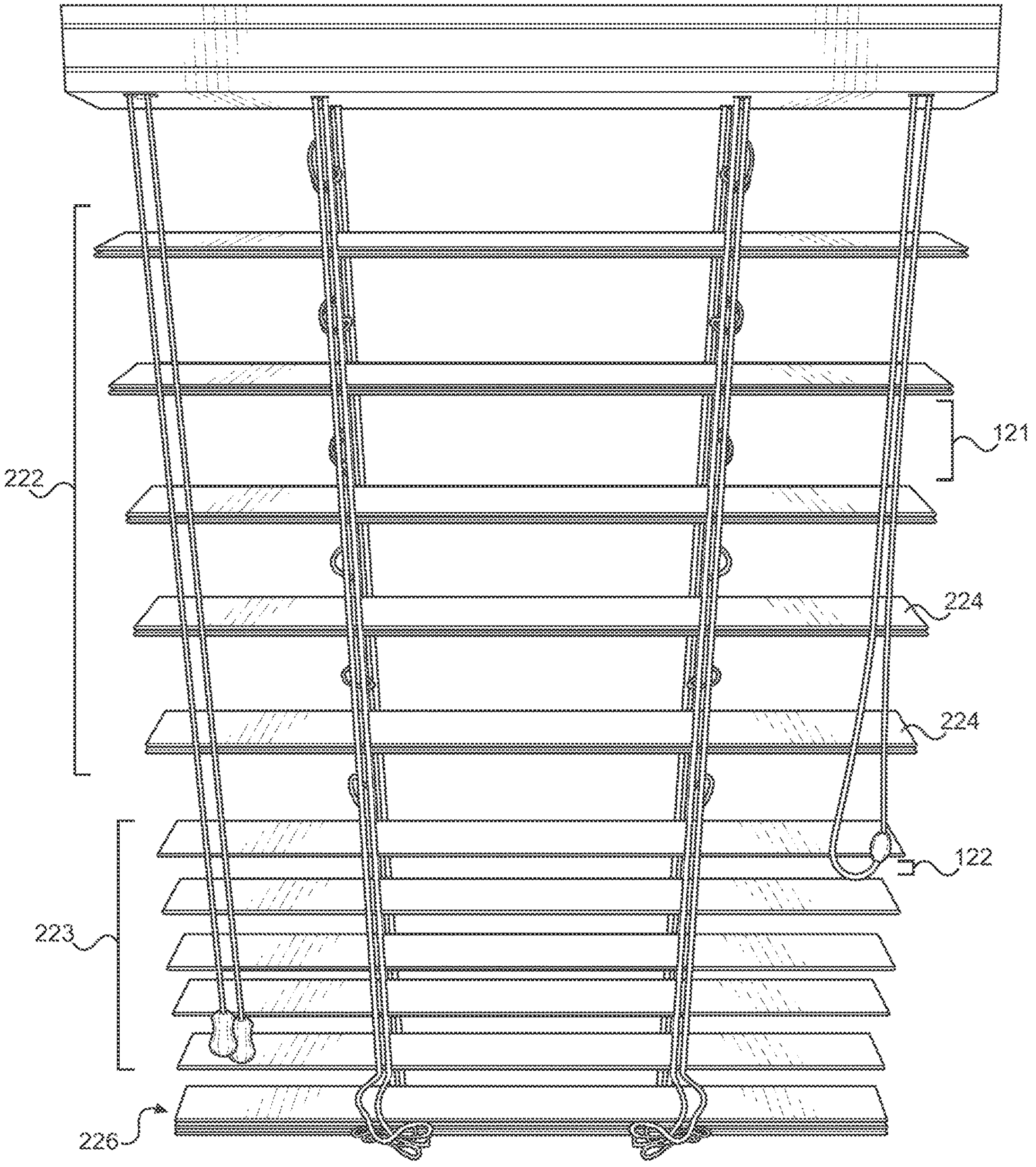
FIG. 2 depicts a front view of a multi-section window blinds system, in another example of an open shading arrangement, according to an aspect.

FIG. 2 depicts a front view of a multi-section window blinds system, in another example of an open shading arrangement, according to an aspect. The first section 222 is in an open state such that each slat of the double slats 224 are resting on each other in a stacked manner, such that each slat is open to the window. In other words, each slat is at a tilt angle that is angled generally perpendicular to the window to allow some sunlight to come through the gaps in between each double slat 224. The shading arrangement of FIG. 2 generally allows more light through the double gap 121 than is allowed through the double gap 121 shown in FIG. 1, due to the double slats 224 being arranged in a stacked manner. In the open shading arrangement shown in FIG. 2, the second section 223 is also in an open state, such that each single slat 225 is at a tilt angle that is angled generally perpendicular to the window to allow some sunlight to come through the gaps between each single slat. These gaps may be referred to as single gaps 122 or "single view," which is smaller than the double view referred to by 121. Generally, the double gap 121 of any shading arrangement is typically larger than the single gap 122. An advantage may be that a user is provided with multiple options for selecting the amount of light and privacy offered by the blinds system when the various sections are used together. In some embodiments, a third section 226 is also provided, wherein the slats of the third section may be collapsed together. In such embodiments, the slats of the third section 226 may be double slats, such as in the first section 222. The third section 226 is shown with more clarity and described when referring to FIG. 4.

Figure 3:
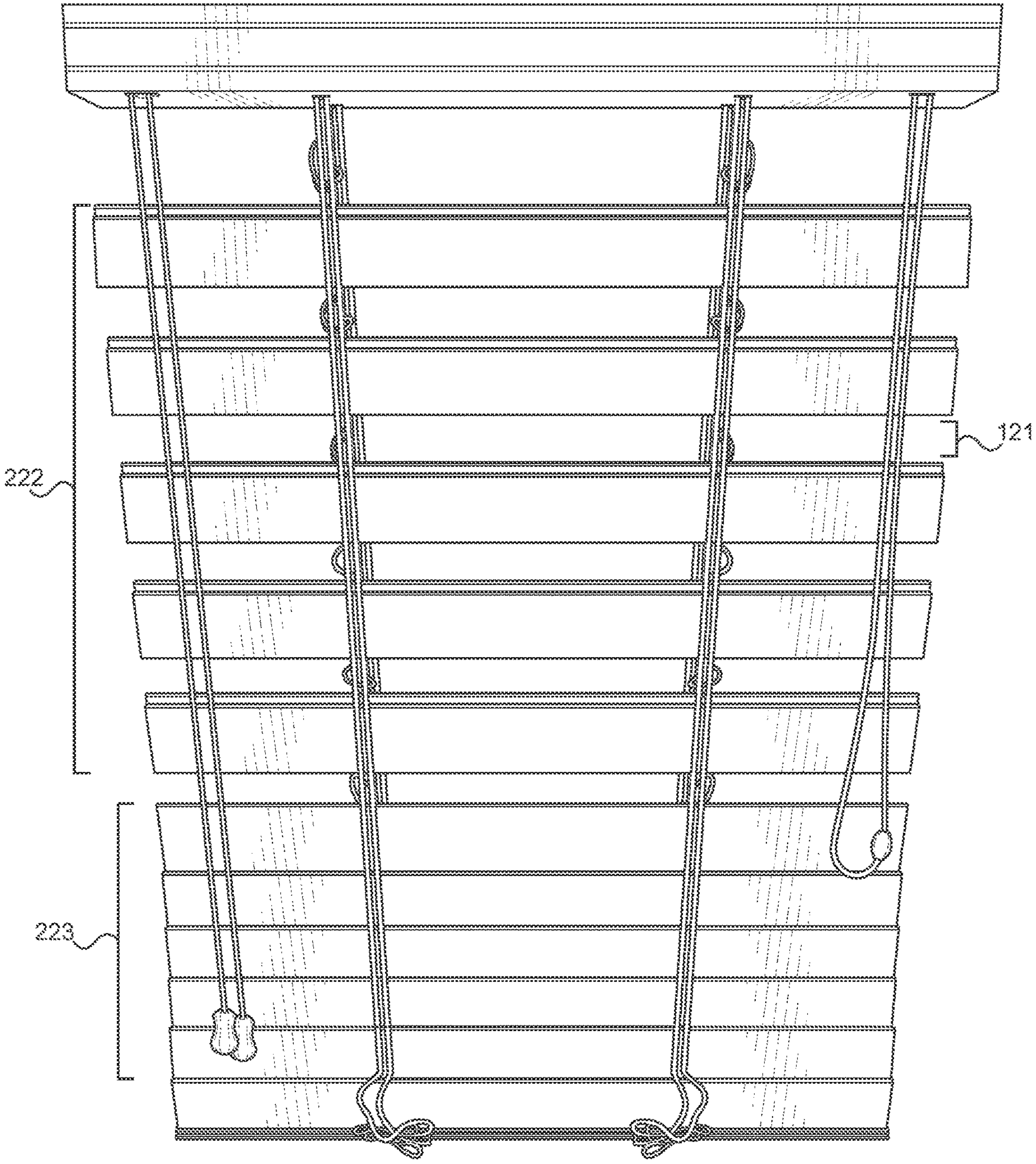
FIG. 3 depicts a front view of a multi-section window blinds system, in an example of a partially closed shading arrangement, according to an aspect.

FIG. 3 depicts a front view of a multi-section window blinds system, in an example of a partially closed shading arrangement, according to an aspect. Similar to the shading arrangement depicted in FIG. 1, the shading arrangement shown in FIG. 3 has a first section 222 comprising double slats 224 that are at a tilt angle such that each slat in a pair, such as pair 224A, are resting on each other in an overlapping manner and closed to the window. In other words, each slat of the double slats 224 is angled generally parallel with respect to the window to block some sunlight and provide some privacy. Meanwhile, each double slat 224 is also separated from neighboring slats by a double gap 121. The second section 223 comprises single slats arranged in an overlapping manner such that each single slat is resting on a neighboring slat, with no gap in between the slats. An advantage may be that some privacy is afforded to the user by closing the view on a bottom portion of a window.

Figure 4:
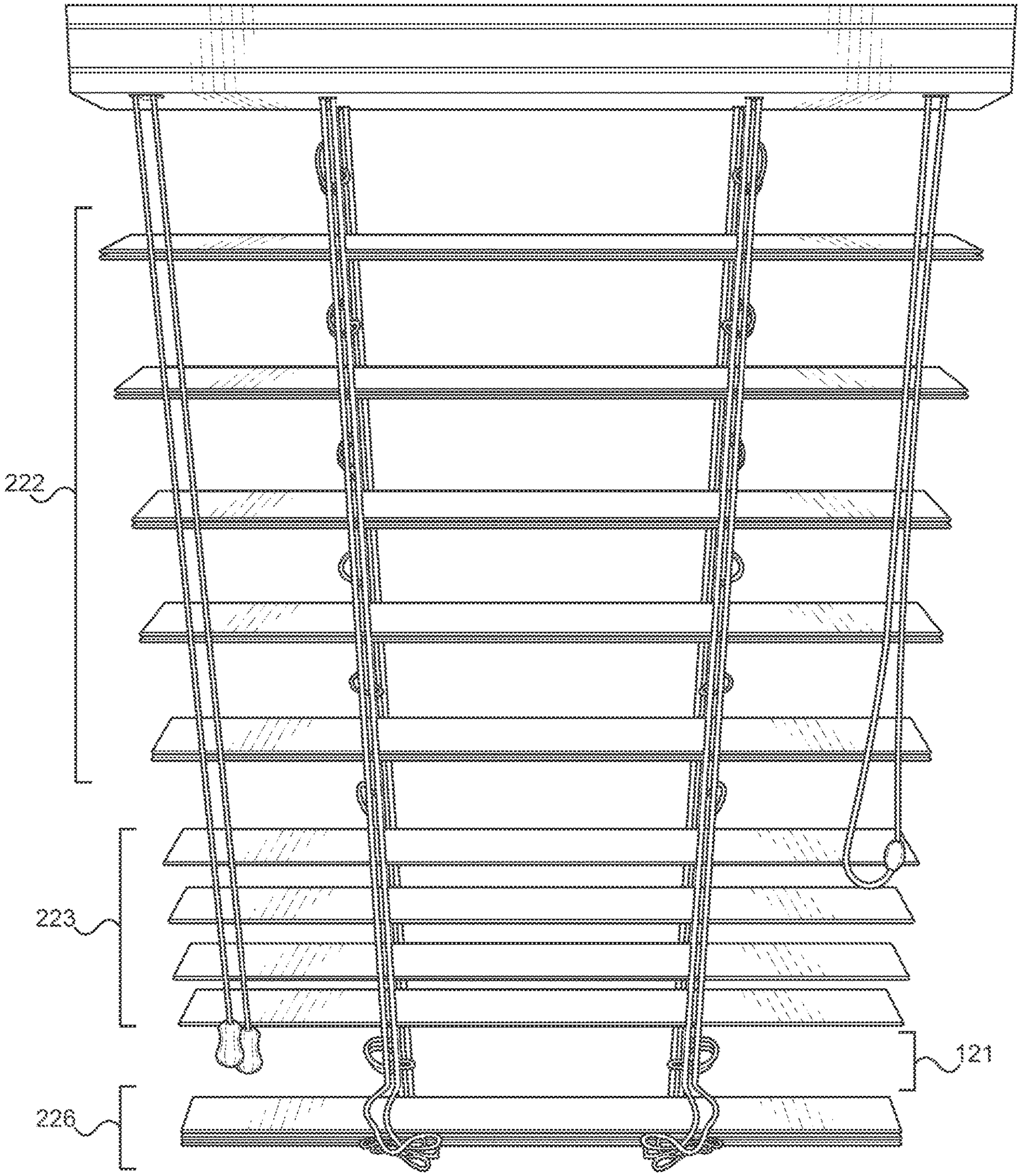
FIG. 4 depicts a front view of a multi-section window blinds system, in another example of an open shading arrangement, according to an aspect.

FIG. 4 depicts a front view of a multi-section window blinds system, in another example of an open shading arrangement, according to an aspect. The shading arrangement shown is generally similar to the shading arrangement depicted in FIG. 2. However, in some embodiments, the blinds systems provided herein may additionally include a double gap between the second section 223 and the third section 226. The slats of the first section 222 and the slats of the third section 226 may be double slats, while the slats of the second section 223 may be single slats. An advantage may be that the user is afforded additional options for customizing the amount of light and privacy provided by the blinds system.

Figure 5:
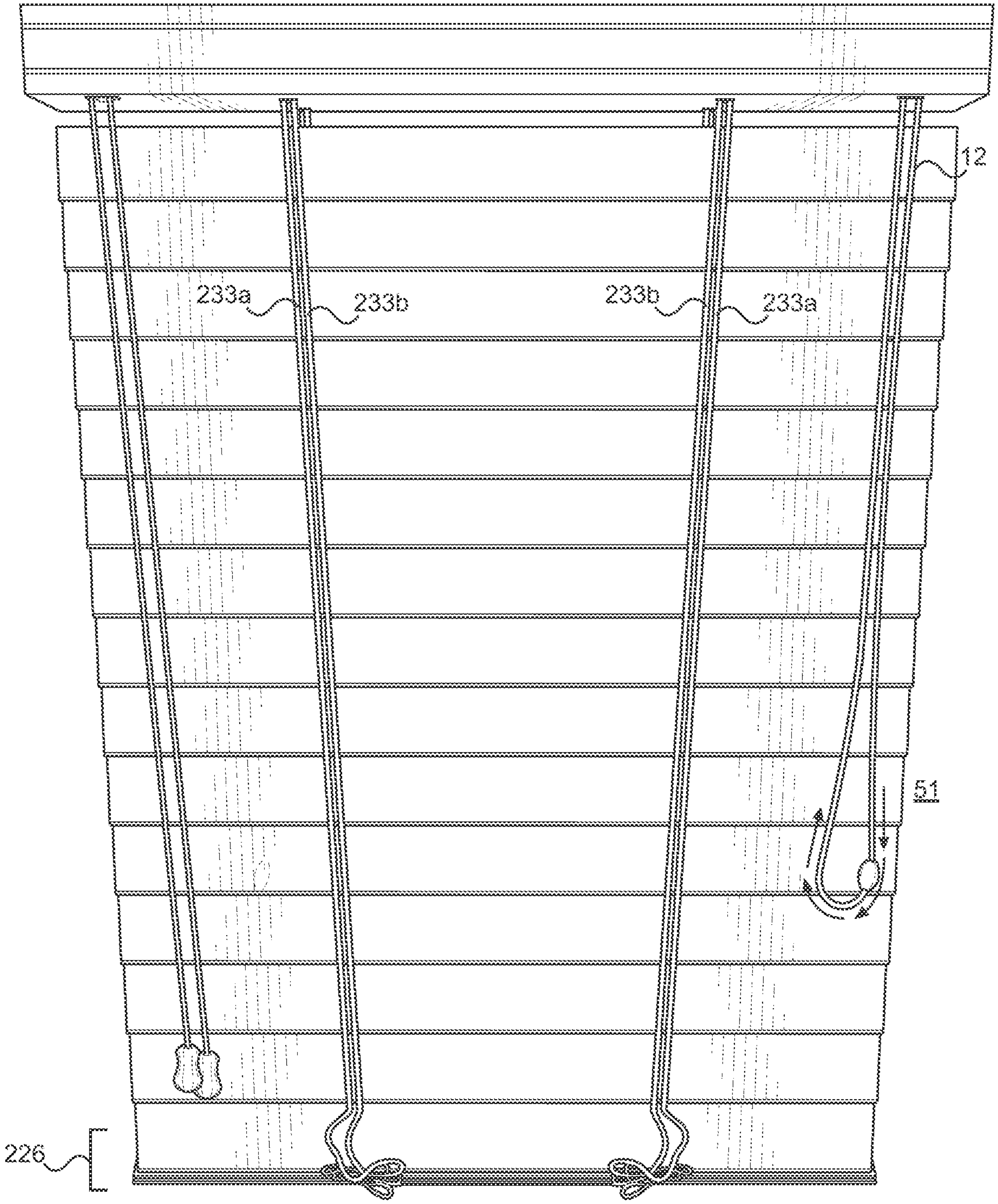
FIG. 5 depicts a front view of a multi-section window blinds system, in an example of a fully closed shading arrangement, according to an aspect.

FIG. 5 depicts a front view of a multi-section window blinds system, in an example of a fully closed shading arrangement, according to an aspect. In some embodiments, the blinds systems provided herein are capable of a fully closed shading arrangement wherein every section is completely closed, leaving no gaps between the slats. In such embodiments, each individual slat of the double slats (as shown in at least FIG. 1) may be arranged such that they are arranged evenly in an overlapping manner with the single slats. In other words, each individual slat of the entire blinds system may lay in an overlapping manner and be evenly spaced along the entirety of the blinds system, whether the slats are part of a double slats pair or are a single slat, wherein the slats are generally parallel to the window and therefore cover the transverse cords (shown by 132 in FIG. 1) along the supporting cords 233*a* and 233*b*. In a fully closed shading arrangement, supporting cords 233*a* and 233*b* along the front side of the blinds system are visible. However, it should be understood that, depending on the height of the window, a section 226 may occur on a bottommost section of the blinds wherein a group of slats is stacked resting on each other. This may occur due to the height of the window being shorter than a height of a fully extended, closed blinds system, for example. Alternatively, this may be due to the user lifting up the bottom third section 226 of the blinds system to be raised upwards such that these slats of the third section 226 are stacked resting on each other.

As will be discussed in further detail when referring to FIGS. 6 and 7, the controlling cord may be controlled in order to change the angle of the slats of the blinds system. For example, the controlling cord could be pulled and therefore rotated in a direction indicated by arrows 51, which can then turn the slats in a first direction. For example, this could cause the slats to turn and angle from the shading arrangement shown in FIG. 4, into the shading arrangement shown in FIG. 3, and further into the shading arrangement shown in FIG. 5. The controlling cord could also be rotated in the direction opposite to arrows 51 causing these movements to happen in reverse, for example.

Figure 6:
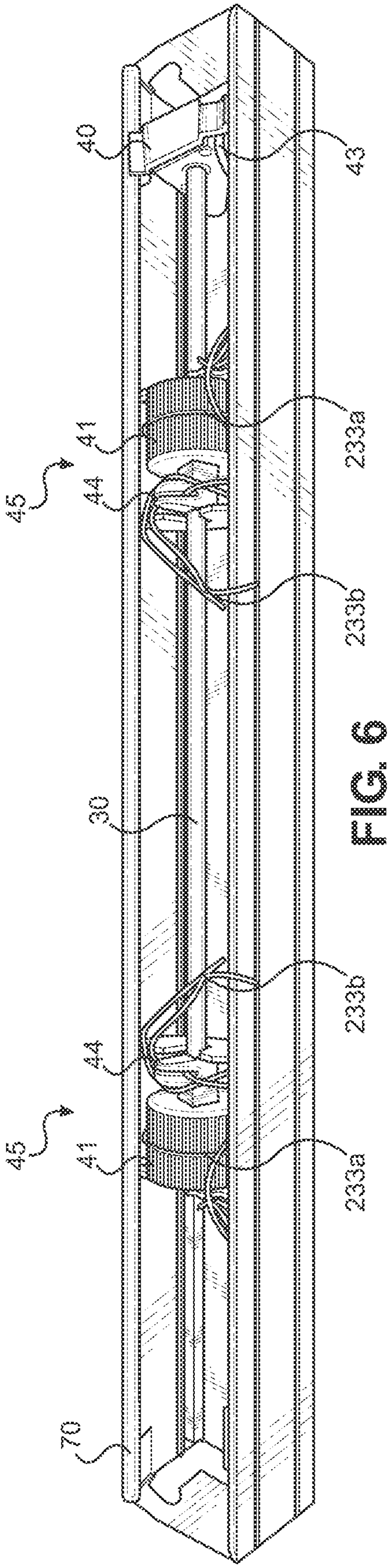
FIG. 6 depicts a top perspective view of an interior of the headrail of the blinds systems provided herein, according to an aspect.

FIG. 6 depicts a top perspective view of an interior of the headrail 70 of the blinds systems provided herein, according to an aspect. The headrail 70 may include a shaft 30, a shaft controlling wheel 43, a shaft controlling unit 40, large wheel units 41 and small wheel units 44, Generally, the operation, configuration, and arrangement of the controlling shaft 50 may be as shown and described in U.S. Pat. No. 7,926,540. As will be discussed in further detail when referring to FIG. 7, the large wheel units 41 are associated with an outer supporting cord 233*a*, the small wheel units 44 are associated with an inner supporting cord 233*b*, and the shaft controlling wheel 43 is associated with the controlling cord (shown as 12 in FIG. 5). The shaft controlling wheel 43 is associated with the shaft 30, which rotates and controls the wheel assemblies 45 which comprise the large and small wheel units.

Figure 7:
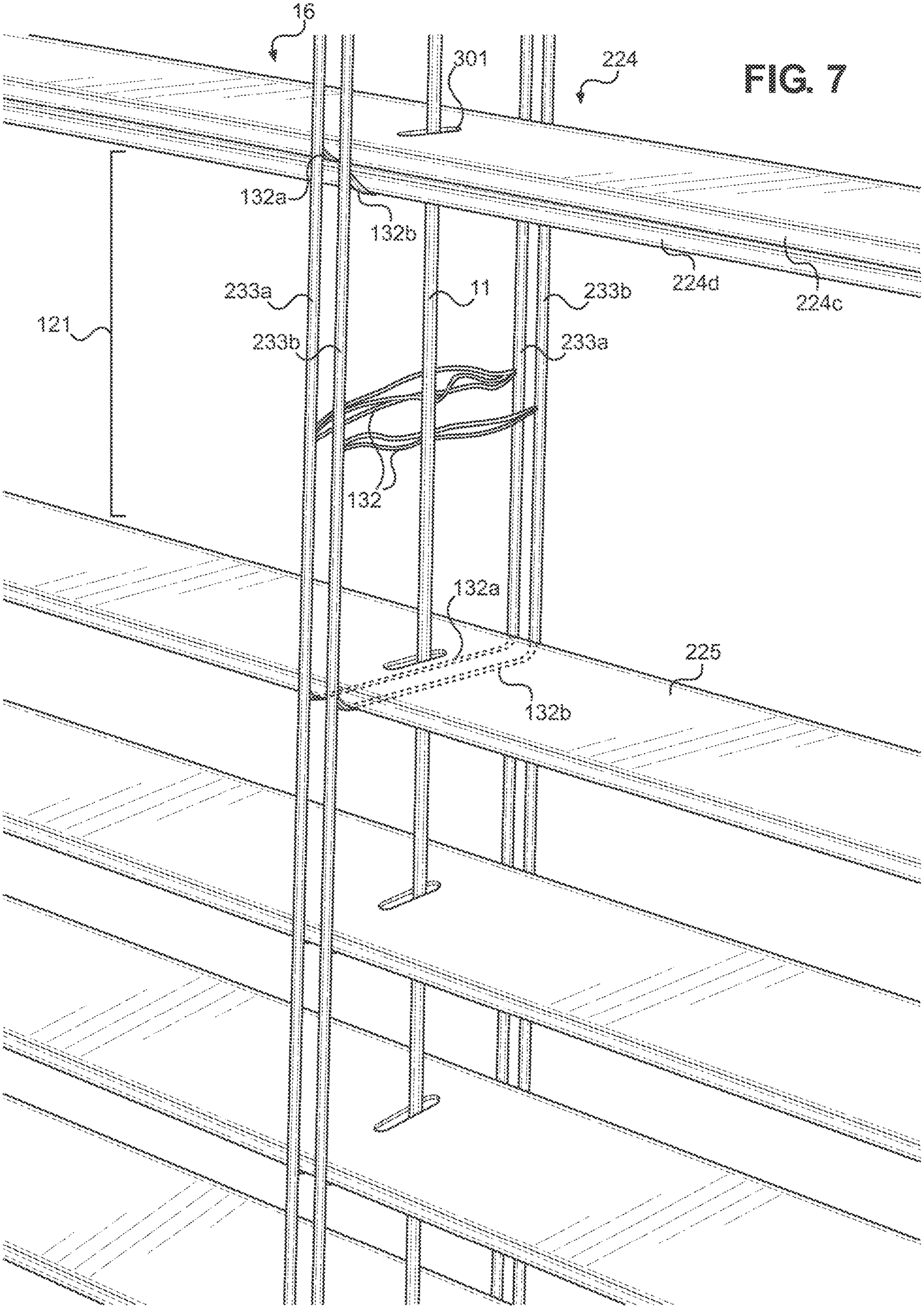
FIG. 7 depicts a detailed side perspective view of a portion of the blinds system showing the arrangement of slats on a first set of cords, with a double slat, a single slat, and a double view gap between the double slat and the single slat, according to an aspect.

FIG. 7 depicts a detailed side perspective view of a portion of the blinds system showing the arrangement of slats on a first set of cords 16*a*, with a double slat 224, a single slat 225, and a double view gap 121 between the double slat and the single slat, according to an aspect. FIG. 7 shows a double slat pair 224 having a top double slat 224C and a bottom double slat 224D, and a single slat 225, with a double gap 121 between the double slat 224 and the single slat 225. As previously described when referring to FIG. 1. The first set of cords 16*a* may comprise a lift cord 11, which passes through each slat, whether the slat is part of a double slat pair or a single slat, through holes 301. The first set of cords 16*a* may also further comprise supporting cord 233*a* and supporting cord 233*b*. Each supporting cord may loop around such that a portion is on the front side of the blinds system and another portion is on the back side of the blinds system.

Each set of transverse cords 132 may extend between the supporting cords. In such embodiments, each set of transverse cords 132 comprises two transverse cords 132A and 132B. In such embodiments, each double slat 224 is supported by the transverse cords in a manner such that a top (or first) transverse cord 132A supports the top double slat 224C, and a bottom (or second) transverse cord 132B supports the bottom double slat 224D. In such embodiments, both the top (or first) transverse cord 132A and the bottom (or second) transverse cord 132B support a single slat 225. Although the two transverse cords do not adopt a top and bottom orientation when supporting a single slat together, it should be understood that the two transverse cords may be of a similar configuration, shape, size, and so on of the transverse cords supporting the double slats.

In some embodiments, the top transverse cord 132A is associated with the outer supporting cord 233*a*, such that the top transverse cord 132A is connected on one end to the outer supporting cord 233*a* on the front side of the blinds system and connected on a second end to the outer supporting cord 233*a* on the back side of the blinds system. In some embodiments, the bottom transverse cord 132B is associated with the inner supporting cord 233*b*, such that the bottom transverse cord 132B is connected on one end to the inner supporting cord 233*b* on the front side of the blinds system and connected on a second end to the inner supporting cord 233*b* on the back side of the blinds system.

The supporting cords are associated with the wheel units shown in FIG. 6. In some embodiments, the front side of the blinds system has an outer supporting cord 233*a*, positioned closer to the outer edge of the blinds system, and an inner supporting cord 233*b*, positioned closer to a center point of the blinds system. In such embodiments, the outer supporting cord 233*a* is associated with the large wheel unit 41. In such embodiments, the inner supporting cord 233*b* is associated with the small wheel unit 44, which is generally L-shaped and is associated with the big wheel as a single assembly. When the wheel assembly 45 is turned, the smaller L-shaped piece moves more slowly due to having a smaller diameter and therefore, the top slat 224C of the double slats moves up faster than the lower slat 224D.

Figure 8:
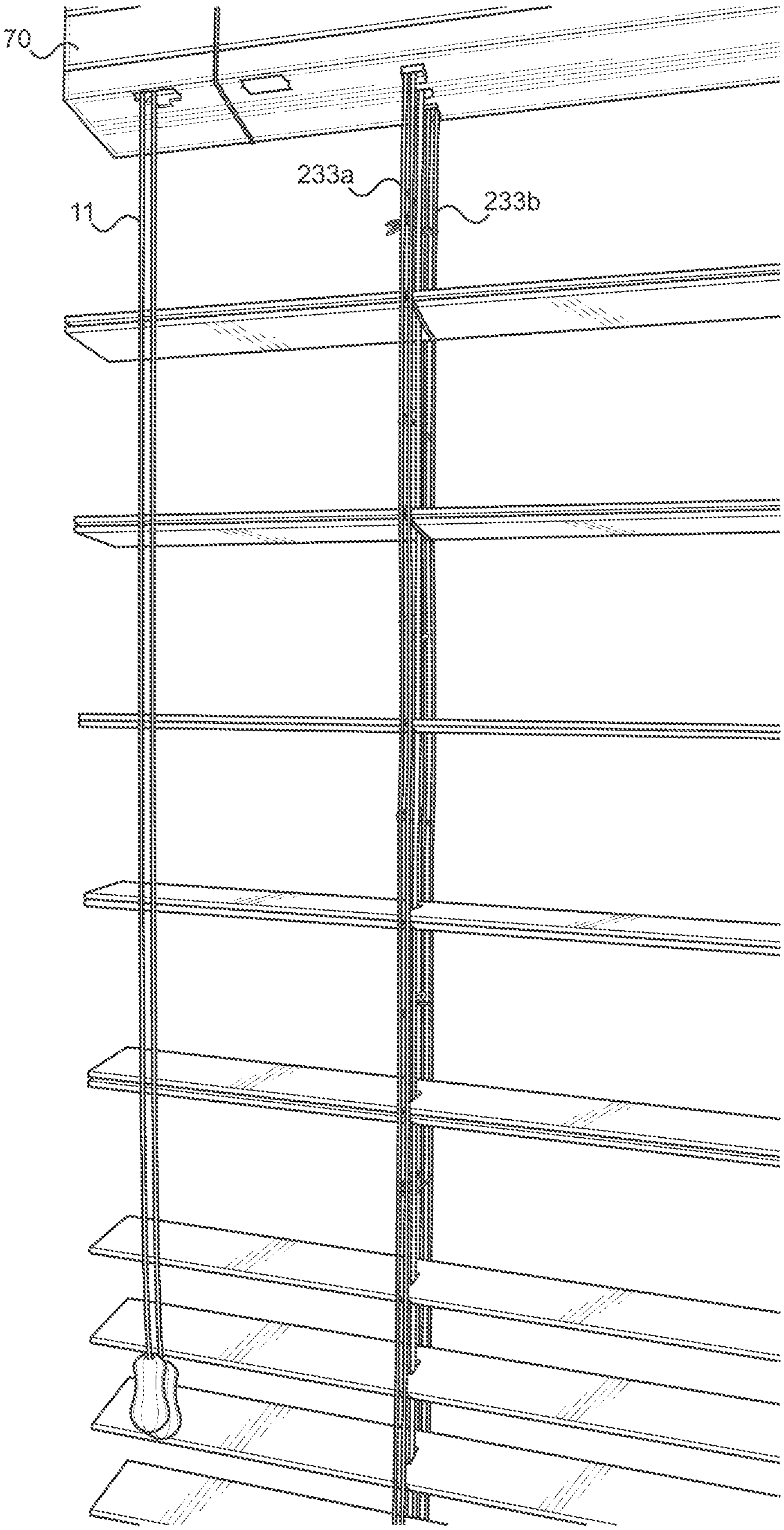
FIG. 8 depicts a partial front perspective view of a multi-section blinds section showing a set of lift cords extending into the headrail, according to an aspect.

FIG. 8 depicts a partial front perspective view of a multi-section blinds section showing a set of lift cords extending into the head rail 70, according to an aspect. It should be understood that the configuration of the blinds and operation of the blinds using a lift cord 11, and controlling cord (shown as 12 in at least FIG. 1) may be constructed and performed as described in U.S. Pat. Nos. 6,648,048 and 7,926,540.

Figure 9:
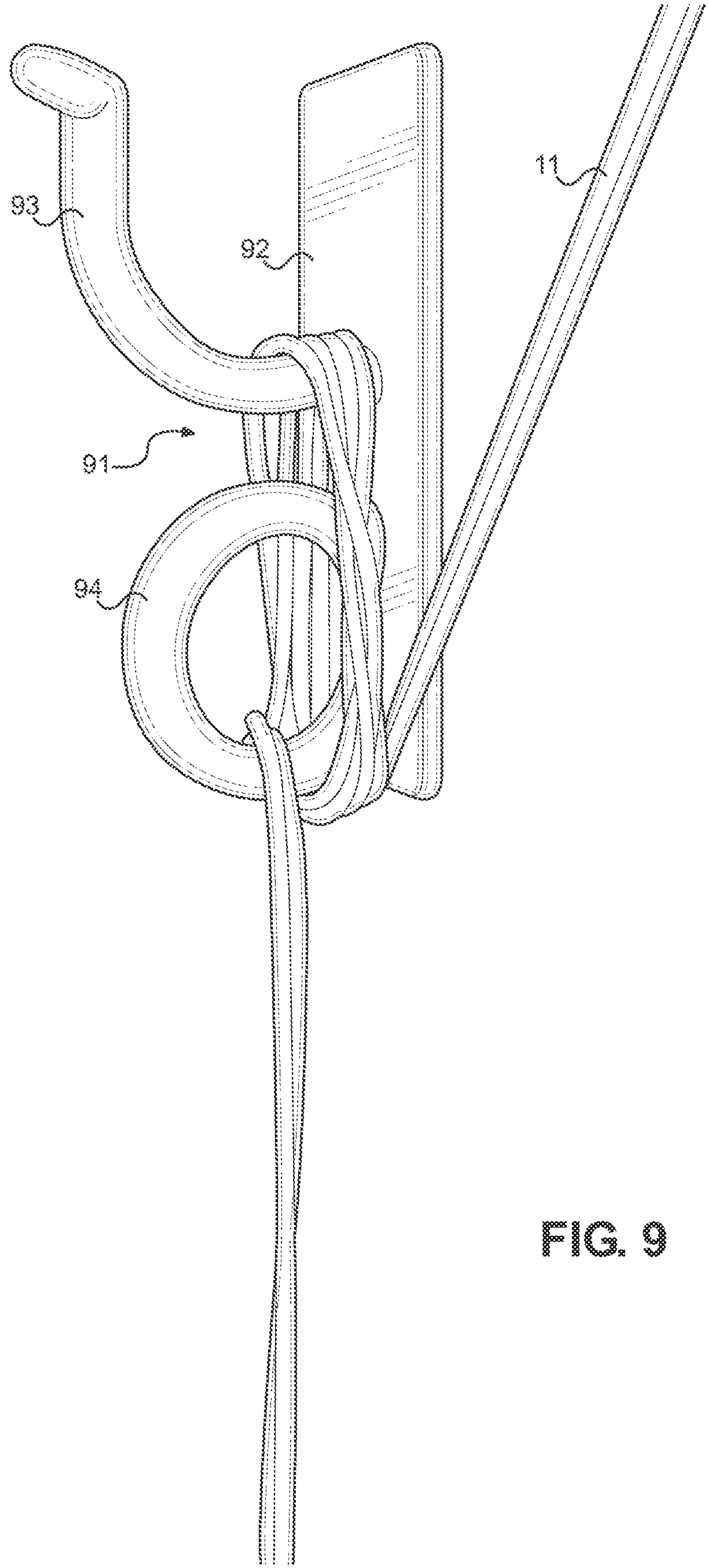
FIGS. 9 and 10 depict two examples of side perspective views of a hook system that may be used with any of the window blinds systems disclosed herein, according to an aspect.
Figure 10:
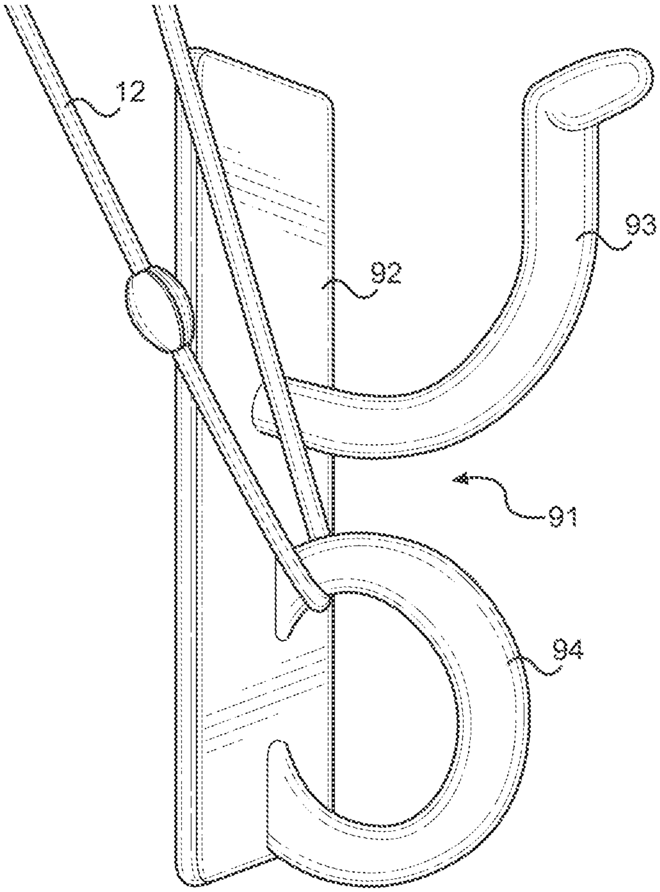

FIGS. 9 and 10 depict two examples of side perspective views of a hook system 91 that may be used with any of the window blinds systems disclosed herein, according to an aspect. Such hook systems 91 may be used on one or both sides of the window blinds disclosed herein. The hook system 91 may be used for wrapping the lift cords 11 of the blinds provided herein, for example, as shown in FIG. 9, or for wrapping the controlling cords, as shown in FIG. 10, such that the controlling cord is passing through the ring. It should be understood that the lift cord 11 and the controlling cord 12 may both be wrapped using hook systems on either side of a blinds system provided herein. An advantage may be that the lengthy controlling cords can be kept out of the way of children, pets, and so on, such that a safety hazard is eliminated. The hook system 91 may comprise a hook 93, a ring 94, and a mounting strip 92. The mounting strip 92 may be used for mounting the hook system onto a wall beside the blinds, for example. The lift cords 11 may be wrapped around the hook 93 and the ring 94 in the manner depicted, or in any other suitable arrangement, for example. In some embodiments, the lift cords of the blinds system can change in length depending on the shading arrangement of the blinds, such as, for example, how much the user chooses to raise or lower the blinds. Therefore, the lift cords could potentially have a long length, and potentially become a choking or safety hazard, or simply cause an inconvenience. Therefore, the lift cord could be wrapped around the hook 93 attached near the left side of the blinds system. On the other hand, the controlling cords provided herein may be provided such that they do not change in length and are simply pulled in around in a loop when used to control the tilt angle of the blinds. Therefore, the controlling cord could be permanently secured through the ring 94 as shown in FIG. 10 by passing through the ring and attaching the controlling cord therein by opening the handle or knob of the controlling cord and reattaching the handle once the cord is passed through the ring. As an example, the handle or knob could be openable and comprise a male and female portion for attaching together, or may be provided with any suitable lockable or interconnected arrangement.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A window blinds system, comprising:

a set of slats extending downwards from a headrail at a top end of the window blinds system, the set of slats comprising:

a first section of a plurality of double slats, a second section of a plurality of single slats below the first section, and a third section of a plurality of double slats below the second section;

a first lift cord and a second lift cord, wherein the first lift cord and the second lift cord each are controllable for raising and lowering at least a portion of the window blinds system;

a controlling cord extending downwards from the headrail, the controlling cord associated with shaft controlling elements within an interior of the headrail;

a plurality of outer supporting cords, each outer supporting cord extending around a front side of the blinds system and a back side of the blinds system, such that an outer supporting cord front section and an outer supporting cord back section are provided;

a plurality of inner supporting cords, each inner supporting cord extending around the front side of the blinds system and the back side of the blinds system, such that an inner supporting cord front section and an inner supporting cord back section are provided;

a plurality of transverse cords, comprising:

a plurality of upper transverse cords associated with the plurality of outer supporting cords, wherein each upper transverse cord is spaced evenly from the top end to a bottom end of the window blinds system between the outer supporting cord front section and the outer supporting cord back section;

a plurality of lower transverse cords associated with the plurality of inner supporting cords, wherein each upper transverse cord is spaced evenly from the top end to a bottom end of the window blinds system between the inner supporting cord front section and the inner supporting cord back section;

wherein pairs of transverse cords are provided by one upper transverse cord and one lower transverse cord alongside each other along the blinds system;

a first set of cords on a first side of the window blinds system, and a second set of cords on a second side of the windows blinds system;

wherein the first set of cords and the second set of cords are separated by a center portion of the blinds system;

wherein the first set of cords comprises the first lift cord, a left outer supporting cord, a left inner supporting cord, a left set of upper transverse cords, and a left set of lower transverse cords, wherein the left inner supporting cord is positioned towards the center portion of the blinds system relative to the left outer supporting cord;

wherein the second set of cords comprises the second lift cord, a right outer supporting cord, a right inner supporting cord, a right set of upper transverse cords, and a left set of lower transverse cords, wherein the right inner supporting cord is positioned towards the center portion of the blinds system relative to the right outer supporting cord;

wherein a maximum amount of space between the double slats is a double gap and a maximum amount of space between the single slats is a single gap when the windows blinds system is in a fully opened shading arrangement, and wherein the double gap is larger than the single gap;

wherein the double gap is created between neighboring double slats, between the first section and the second section, and between the second section and the third section, by providing an empty pair of transverse cords not supporting any slat within the double gap, such that the first section and the second section are separated by presence of a double gap having an empty pair of transverse cords;

wherein the single gap is created between neighboring single slats by mounting single slats onto each pair of transverse cords within the second section with no empty pairs of transverse cords within the second section, such that the second section and the third section are separated by presence of a double gap having an empty pair of transverse cords;

wherein each double slat comprises a top double slat and a bottom double slat each arranged on a single pair of transverse cords such that the top double slat is supported by a single upper transverse cord, and the bottom double slat is supported by a single lower transverse cord;

wherein each single slat is arranged on a single pair of transverse cords such that the single slat is supported by both the upper transverse cord and the lower transverse cord of the pair of transverse cords such that the upper transverse cord and the lower transverse cord support the single slat together;

wherein the window blinds system is configured to be positioned into a variety of shading arrangements by adjusting a tilt angle of the plurality of double slats and the plurality of single slats and by adjusting a distance between neighboring slats of the set of slats.

2. The window blinds system of claim 1, wherein the shaft controlling elements of the headrail comprises:

a plurality of wheel assemblies, each wheel assembly comprising:

a large wheel unit associated with an outer supporting cord of the plurality of outer supporting cords;

a small wheel unit connected to the large wheel unit, wherein the small wheel unit comprises an L-shape, and is associated with an inner supporting cord of the plurality of inner supporting cords;

a shaft associated with each wheel assembly of the plurality of wheel assemblies;

a shaft controlling wheel associated with the shaft and configured to rotate the shaft and rotate the wheel assemblies.

3. The window blinds system of claim 2, wherein the tilt angle is controllable by manipulating the controlling cord; wherein the controlling cord is associated with the shaft controlling wheel of the shaft controlling elements; and wherein the plurality of outer supporting cords and the plurality of inner supporting cords are controlled by a rotation of the shaft.

4. The window blinds system of claim 1, wherein pulling the controlling cord in a first direction causes changes in the tilt angle of the plurality of double slats and the plurality of double slats from the fully opened shading arrangement to a fully closed shading arrangement.

5. The window blinds system of claim 1, wherein the variety of shading arrangements comprises:

the fully opened shading arrangement, wherein each double slat of the plurality of double slats is arranged in a pair such that the top double slat and the bottom double slat are resting against each other and the double gaps are provided between the double slats, and wherein the single gaps are provided between the single slats, and wherein the tilt angle of the slats of the set of slats is substantially parallel with the headrail;

a fully closed shading arrangement, wherein each slat of the set of slats is overlapping with neighboring slats and no gaps are provided between neighboring slats, and wherein the tilt angle of the slats of the set of slats is substantially perpendicular with the headrail;

and a partially open shading arrangement, wherein the slats of the set of slats is angled with respect to the headrail and wherein the top double slat and the bottom double slat of each of the plurality of double slats are overlapping with each other and a partial gap is provided between neighboring slats.

6. The window blinds system of claim 1, wherein the first lift cord passes through a first set of holes on each slat of the set of slats along the first side of the window blinds system, and wherein the second lift cord passes through a second set of holes on each slat of the set of slats along the second side of the window blinds system.

7. A window blinds system, comprising:

a set of slats comprising:

a first section of a plurality of double slats, a second section of a plurality of single slats below the first section;

a first lift cord and a second lift cord, wherein the first lift cord and the second lift cord each are controllable for raising and lowering at least a portion of the window blinds system;

a plurality of outer supporting cords, each outer supporting cord extending around a front side of the blinds system and a back side of the blinds system, such that an outer supporting cord front section and an outer supporting cord back section are provided;

a plurality of inner supporting cords, each inner supporting cord extending around the front side of the blinds system and the back side of the blinds system, such that an inner supporting cord front section and an inner supporting cord back section are provided;

a plurality of transverse cords, comprising:

a plurality of upper transverse cords associated with the plurality of outer supporting cords, wherein each upper transverse cord is spaced evenly from a top end to a bottom end of the window blinds system between the outer supporting cord front section and the outer supporting cord back section;

a plurality of lower transverse cords associated with the plurality of inner supporting cords, wherein each upper transverse cord is spaced evenly from the top end to a bottom end of the window blinds system between the inner supporting cord front section and the inner supporting cord back section;

wherein pairs of transverse cords are provided by one upper transverse cord and one lower transverse cord alongside each other along the blinds system;

wherein a maximum amount of space between the double slats is a double gap and a maximum amount of space between the single slats is a single gap when the windows blinds system is in a fully opened shading arrangement, and wherein the double gap is larger than the single gap;

wherein the double gap is created between neighboring double slats, between the first section and the second section, and between the second section and the third section, by providing an empty pair of transverse cords not supporting any slat within the double gap;

wherein the single gap is created between neighboring single slats by mounting single slats onto each pair of transverse cords within the second section with no empty pairs of transverse cords within the second section, such that the first section and the second section are separated by presence of a double gap having an empty pair of transverse cords;

wherein each double slat comprises a top double slat and a bottom double slat each arranged on a single pair of transverse cords such that the top double slat is supported by a single upper transverse cord, and the bottom double slat is supported by a single lower transverse cord;

wherein each single slat is arranged on a single pair of transverse cords such that the single slat is supported by both the upper transverse cord and the lower transverse cord of the pair of transverse cords such that the upper transverse cord and the lower transverse cord support the single slat together;

wherein the window blinds system is configured to be positioned into a variety of shading arrangements by adjusting a tilt angle of the plurality of double slats and the plurality of single slats and by adjusting a distance between neighboring slats of the set of slats.

8. The window blinds system of claim 7, wherein the variety of shading arrangements comprises:

the fully opened shading arrangement, wherein each double slat of the plurality of double slats is arranged in a pair such that the top double slat and the bottom double slat are resting against each other and the double gaps are provided between the double slats, and wherein the single gaps are provided between the single slats, and wherein the tilt angle of the slats of the set of slats is substantially parallel with the headrail;

a fully closed shading arrangement, wherein each slat of the set of slats is overlapping with neighboring slats and no gaps are provided between neighboring slats, and wherein the tilt angle of the slats of the set of slats is substantially perpendicular with the headrail;

and a partially open shading arrangement, wherein the slats of the set of slats is angled with respect to the headrail and wherein the top double slat and the bottom double slat of each of the plurality of double slats are overlapping with each other and a partial gap is provided between neighboring slats.

9. The window blinds system of claim 7, wherein the first lift cord passes through a first set of holes on each slat of the set of slats along a first side of the window blinds system, and wherein the second lift cord passes through a second set of holes on each slat of the set of slats along a second side of the window blinds system.

10. The window blinds system of claim 7, comprising a headrail at the top end of the window blinds system, the headrail comprising:

a plurality of wheel assemblies, each wheel assembly comprising:

a large wheel unit associated with an outer supporting cord of the plurality of outer supporting cords;

a small wheel unit connected to the large wheel unit, wherein the small wheel unit comprises an L-shape, and is associated with an inner supporting cord of the plurality of inner supporting cords;

a shaft associated with each wheel assembly of the plurality of wheel assemblies;

a shaft controlling wheel associated with the shaft and configured to rotate the shaft and rotate the wheel assemblies.

11. The window blinds system of claim 10, further comprising a controlling cord associated with shaft controlling wheel.

12. The window blinds system of claim 11, wherein the tilt angle is controllable by manipulating the controlling cord; wherein the controlling cord is associated with the shaft controlling wheel of the shaft controlling elements; and wherein the plurality of outer supporting cords and the plurality of inner supporting cords are controlled by a rotation of the shaft.

13. The window blinds system of claim 11, wherein pulling the controlling cord in a first direction causes changes in the tilt angle of the plurality of double slats and the plurality of double slats from the fully opened shading arrangement to a fully closed shading arrangement.

14. A method of providing a variety of shading arrangements using a window blinds system, the window blinds system comprising:

a set of slats extending downwards from a headrail at a top end of the window blinds system, the set of slats comprising:

a first section of a plurality of double slats, a second section of a plurality of single slats below the first section, and a third section of a plurality of double slats below the second section;

a controlling cord associated with shaft controlling elements, wherein the controlling cord comprises a loop shape;

a plurality of outer supporting cords, each outer supporting cord extending around a front side of the blinds system and a back side of the blinds system, such that an outer supporting cord front section and an outer supporting cord back section are provided;

a plurality of inner supporting cords, each inner supporting cord extending around the front side of the blinds system and the back side of the blinds system, such that an inner supporting cord front section and an inner supporting cord back section are provided;

a plurality of transverse cords, comprising:

a plurality of upper transverse cords associated with the plurality of outer supporting cords, wherein each upper transverse cord is spaced evenly from a top end to a bottom end of the window blinds system between the outer supporting cord front section and the outer supporting cord back section;

a plurality of lower transverse cords associated with the plurality of inner supporting cords, wherein each upper transverse cord is spaced evenly from the top end to a bottom end of the window blinds system between the inner supporting cord front section and the inner supporting cord back section;

wherein pairs of transverse cords are provided by one upper transverse cord and one lower transverse cord alongside each other along the blinds system;

wherein a maximum amount of space between the double slats is a double gap and a maximum amount of space between the single slats is a single gap when the windows blinds system is in a fully opened shading arrangement, and wherein the double gap is larger than the single gap;

wherein the double gap is created between neighboring double slats, between the first section and the second section, and between the second section and the third section, by providing an empty pair of transverse cords not supporting any slat within the double gap, such that the first section and the second section are separated by presence of a double gap having an empty pair of transverse cords;

wherein the single gap is created between neighboring single slats by mounting single slats onto each pair of transverse cords within the second section with no empty pairs of transverse cords within the second section, such that the second section and the third section are separated by presence of a double gap having an empty pair of transverse cords;

wherein each double slat comprises a top double slat and a bottom double slat each arranged on a single pair of transverse cords such that the top double slat is supported by a single upper transverse cord, and the bottom double slat is supported by a single lower transverse cord;

wherein each single slat is arranged on a single pair of transverse cords such that the single slat is supported by both the upper transverse cord and the lower transverse cord of the pair of transverse cords such that the upper transverse cord and the lower transverse cord support the single slat together;

the method comprising:

pulling the controlling cord in a first direction to adjust a tilt angle of the plurality of double slats and the plurality of single slats and to adjust a distance between neighboring slats of the set of slats.

15. The method of claim 14, wherein pulling the controlling cord in the first direction decreases the distance between neighboring slats of the set of slats, and wherein pulling the controlling cord in a second direction opposite to the first direction increases the distance between neighboring slats of the set of slats.

16. The method of claim 14, wherein the variety of shading arrangements comprises:

the fully opened shading arrangement, wherein each double slat of the plurality of double slats is arranged in a pair such that the top double slat and the bottom double slat are resting against each other and the double gaps are provided between the double slats, and wherein the single gaps are provided between the single slats, and wherein the tilt angle of the slats of the set of slats is substantially parallel with the headrail;

a fully closed shading arrangement, wherein each slat of the set of slats is overlapping with neighboring slats and no gaps are provided between neighboring slats, and wherein the tilt angle of the slats of the set of slats is substantially perpendicular with the headrail;

and a partially open shading arrangement, wherein the slats of the set of slats is angled with respect to the headrail and wherein the top double slat and the bottom double slat of each of the plurality of double slats are overlapping with each other and a partial gap is provided between neighboring slats.

17. The method of claim 14, wherein pulling the controlling cord in the first direction causes changes in the tilt angle of the plurality of double slats and the plurality of double slats from the fully opened shading arrangement to a fully closed shading arrangement.

18. The method of claim 14, the headrail comprising:

a plurality of wheel assemblies, each wheel assembly comprising:

a large wheel unit associated with an outer supporting cord of the plurality of outer supporting cords;

a small wheel unit connected to the large wheel unit, wherein the small wheel unit comprises an L-shape, and is associated with an inner supporting cord of the plurality of inner supporting cords;

a shaft associated with each wheel assembly of the plurality of wheel assemblies;

a shaft controlling wheel associated with the shaft and configured to rotate the shaft and rotate the wheel assemblies.

19. The method of claim 14, the method further comprising providing a first hook system on a left side of the window blinds system and a second hook system on a right side of the window blinds system, wherein each hook system comprises a mounting strip, a hook, and a ring; and providing an openable locking end on the controlling cord.

20. The method of claim 19, comprising:

opening the locking end on the controlling cord such that the controlling cord is no longer comprises the loop shape;

passing the locking end of the controlling cord through the right of the second hook system;

closing the locking end on the controlling cord such that the controlling cord comprises the loop shape passing through the ring.

* * * * *